United States Patent

Sano et al.

Patent Number: 5,614,573
Date of Patent: Mar. 25, 1997

[54] FLAME RETARDANTS AND FLAME RETARDANT FINISHING METHOD FOR POLYESTER-BASED SYNTHETIC FIBER MATERIALS

[75] Inventors: Junji Sano, Amagasaki; Kunio Ichihashi, Osaka; Hajime Saito, Sabae; Hirotomo Banko, Sakai-gun, all of Japan

[73] Assignees: Nicca Chemical Co., Ltd., Fukui; Kanebo Limited, Tokyo, both of Japan

[21] Appl. No.: 410,840

[22] Filed: Mar. 27, 1995

[51] Int. Cl.$^6$ .............. C08K 5/53; C08K 5/52; C08K 5/51

[52] U.S. Cl. .......... 524/121; 524/126; 524/127; 524/131; 524/132; 524/141; 524/145; 558/160; 558/162; 558/180; 558/184; 558/187; 558/196

[58] Field of Search ............... 524/125, 126, 524/127, 131, 132, 133, 141, 145; 558/162, 196, 184, 187, 180, 160

[56] References Cited

U.S. PATENT DOCUMENTS

| | | | |
|---|---|---|---|
| Re. 27,969 | 4/1974 | Camacho et al. | 528/287 |
| 2,643,265 | 6/1953 | Toy et al. | 558/162 |
| 3,360,591 | 12/1967 | Giammaria et al. | 558/162 |
| 3,719,727 | 3/1973 | Masai et al. | 524/125 |
| 3,830,771 | 8/1974 | Cohen et al. | 528/287 |
| 3,932,566 | 1/1976 | Reader | 558/160 |
| 4,298,709 | 11/1981 | Ginter et al. | 528/287 |
| 4,314,052 | 2/1982 | Engelhardt et al. | 528/287 |
| 4,315,847 | 2/1982 | Login et al. | 528/287 |

FOREIGN PATENT DOCUMENTS

| | | |
|---|---|---|
| 0327092 | 8/1989 | European Pat. Off. . |
| 47-32299 | 8/1972 | Japan . |
| 49-22452 | 2/1974 | Japan . |
| 51-73596 | 6/1976 | Japan . |
| 51-86600 | 7/1976 | Japan . |
| 51-111869 | 10/1976 | Japan . |
| 52-09059 | 1/1977 | Japan . |
| 52-010350 | 1/1977 | Japan . |
| 6-228814 | 8/1994 | Japan . |
| 6-248575 | 9/1994 | Japan . |

*Primary Examiner*—Veronica P. Hoke
*Attorney, Agent, or Firm*—McAulay Fisher Nissen Goldberg & Kiel, LLP

[57] ABSTRACT

Flame retardant compounds including at least one of a group of specified phosphoryl compounds which have a phenylene group in the molecule are applied to fiber materials composed of polyester-based synthetic fibers. Sufficiently long-lasting flame retardancy may be imparted to polyester-based synthetic fiber materials without the use of halogen compounds.

1 Claim, No Drawings

FLAME RETARDANTS AND FLAME RETARDANT FINISHING METHOD FOR POLYESTER-BASED SYNTHETIC FIBER MATERIALS

BACKGROUND OF THE INVENTION

1. Field of the Invention

The present invention relates to flame retardant compounds which impart flame retardancy to fiber materials composed of polyester-based synthetic fibers, and to a method for flame retardant finishing of polyester-based synthetic fiber materials; particularly, it relates to flame retardant compounds which impart flame retardancy with excellent durability against laundering, dry cleaning and the like, to fiber materials composed of polyester-based synthetic fibers, as well as to a method for flame retardant finishing of polyester-based synthetic fiber materials.

2. Description of the Related Art

Although fiber materials composed of polyester-based synthetic fibers possess a variety of excellent physical and chemical properties, a common drawback is their ready tendency to combustion, for which reason such polyester-based synthetic fiber materials have traditionally been subjected to finishing treatment for flame retardancy.

To impart flame retardancy to polyester-based synthetic fiber materials by finishing treatment as mentioned above, the prior art teaches the use of halogen compounds as flame retardant compounds, and flame retardancy has been imparted to polyester-based synthetic fiber materials by finishing treatment with such halogen compounds.

Here, bromine- and chlorine-containing compounds are known to be particularly effective as halogen compounds, and finishing treatment with these halogen compounds on polyester-based synthetic fiber materials typically involves dissolving a halogen-containing compound such as a halogenated cycloalkane, specifically hexabromocyclododecane, in a solvent, or using a dispersing agent or the like for its emulsification and dispersion in water, in combination with other additives when necessary, to prepare a treatment solution which is then applied to the polyester-based synthetic fiber materials mentioned above by a method such as coating, immersion or spraying.

However, when a halogen compound is applied to a polyester-based synthetic fiber material in this manner for flame retardancy, harmful halide gas is generated in the event of combustion of the polyester-based synthetic fibers, thus having an adverse effect on the environment, and therefore in recent years restrictions have been imposed on such halogen compounds.

In light of this, as alternative flame retardant compounds instead of the above-mentioned halogen compounds, the prior art has also employed phosphorus-containing compounds such as phosphoric esters and the like to impart flame retardancy to polyester-based synthetic fiber materials.

Here, the phosphorus-containing compounds which have traditionally been in common use as flame retardant compounds have low phosphorus contents and molecular weights usually as low as 200–400, and tend to degrade and volatilize at lower than the inflammation point of polyester-based synthetic fibers; consequently, they cannot impart flame retardancy to the polyester-based synthetic fiber materials as adequately as the above-mentioned halogen compounds, and thus such phosphorus compounds have had to be applied in large amounts in order to impart satisfactory flame retardancy to polyester-based synthetic fiber materials.

However, application of large amounts of these phosphorus compounds tends to cause trouble during the treatment, and when applied in large amounts phosphorus compounds result in an inferior hand of the polyester-based synthetic fiber materials.

Furthermore, when such phosphorus compounds are applied to polyester-based synthetic fiber materials, they gradually migrate through the surface of the polyester-based synthetic fiber materials with the passing of time, and their migration is accompanied by that of disperse dyes added for dyeing of the polyester-based synthetic fiber materials and dissolved in the phosphorus compounds, resulting in the problem known as "bleeding to surface" which lowers the color fastness.

SUMMARY OF THE INVENTION

It is an object of the present invention to overcome the aforementioned problems which occur during post-finishing treatment of polyester-based synthetic fiber materials to impart flame retardancy.

In other words, in order to impart flame retardancy to polyester-based synthetic fiber materials by finishing treatment thereof, the present invention provides flame retardant compounds for imparting flame retardancy to fiber materials composed of polyester-based synthetic fibers, and a method for flame retardant finishing of polyester-based synthetic fiber materials, which allow sufficiently durable flame retardancy to be easily imparted to polyester-based synthetic fiber materials without the use of halogen compounds and with no loss in the quality of hand of the polyester-based synthetic fiber materials as a result of imparting the flame retardancy.

The above-mentioned problems are overcome according to the present invention, whereby there is imparted to a polyester-based synthetic fiber material a flame retardant compound including at least one of the types of phosphoryl compounds represented by the formulas (1) to (4) shown below which have phenylene groups in the molecule.

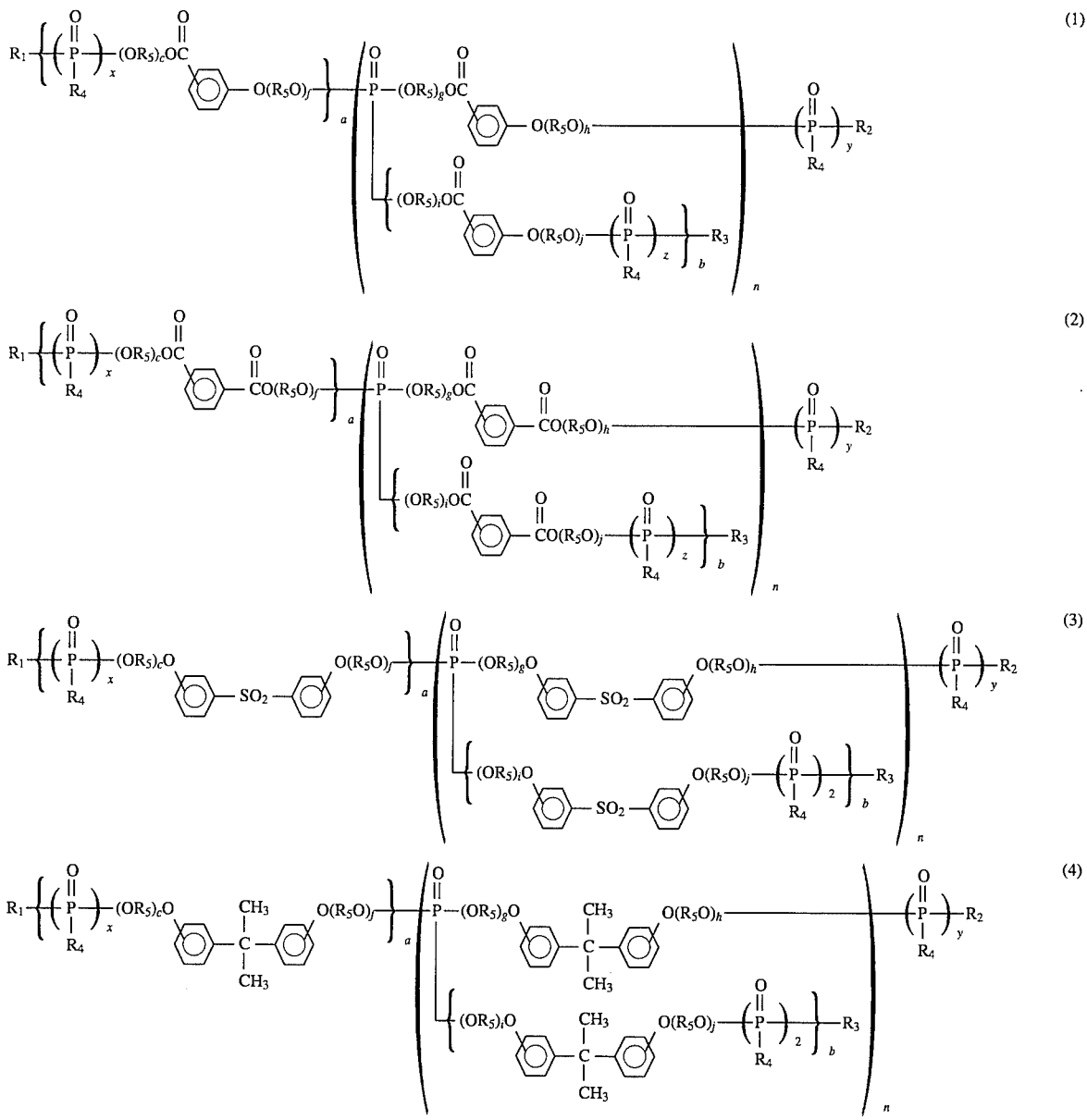

wherein $R_1$, $R_2$, $R_3$ and $R_4$ independently represent alkyl or alkoxy groups of 1 to 12 carbon atoms, unsubstituted or substituted phenyl groups or unsubstituted or substituted phenyloxy groups, or hydrogen; each Rs independently represents an alkylene group of 2 to 6 carbon atoms, preferably 2 or 3 carbon atoms; the letters a, b, e, f, g, h, i and j independently represent either 0 or an integer from 1 to 6, preferably 1 to 3; each letter n independently represents an integer from 1 to 6, preferably 1 to 3; and the letters x, y and z independently represent either 0 or 1.

Here, the phosphoryl compounds represented by the above general formulas (1) to (4) which are used as flame retardant compounds may generally be obtained by reacting phosphoryl compounds such as phosphorus oxychloride and phenylphosphonic dichloride, with salicylic acid derivatives, phthalic acid derivatives, dihydroxydiphenylsulfone derivatives or dihydroxydiphenylpropane derivatives represented by the respective general formulas (5) to (8) given below and with alkyl alcohols or phenols, in the presence of a catalyst; the molecular weights are usually between 500 and 3500, and they are composed of components with structures similar to the polyester-based synthetic fibers. The salicylic acid derivatives, phthalic acid derivatives, dihydroxydiphenylsulfone derivatives or dihydroxydiphenylpropane derivatives represented by the respective general formulas (5) to (8) are normally obtained by addition of an alkylene oxide to salicylic acid, phthalic acid, dihydroxydiphenylsulfone or dihydroxydiphenylpropane, in the presence of an alkali catalyst such as caustic soda or caustic potash.

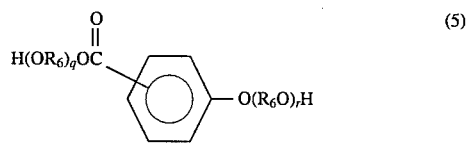

(5)

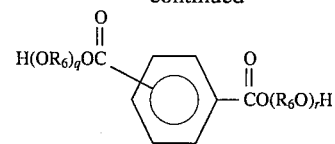
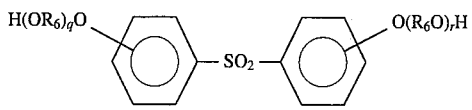
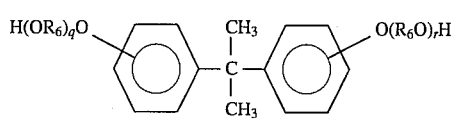

wherein each $R_6$ independently represents an alkylene group of 2 to 6 carbon atoms, and q and r each independently represent 0 or an integer from 1 to 6.

On the other hand, the above-mentioned polyester-based synthetic fibers which may be used include, for example, polyethylene terephthalate, polybutylene terephthalate, polyoxyethoxy benzoate, polyethylene naphthalate, cyclohexanedimethylene terephthalate, as well as these polyesters copolymerized with additional components including dicarboxylic acid components such as isophthalic acid, adipic acid, sulfoisophthalic acid, etc. and diol components such as propylene glycol, butylene glycol, cyclohexanedimethanol, diethylene glycol, etc.

Also, the fiber materials composed of these polyester-based synthetic fibers may be in the form of yarns, woven fabrics, knitted fabrics, nonwoven fabrics, or the like.

When a phosphoryl compound is added to a polyester-based synthetic fiber material, usually a dispersion of the phosphoryl compound in water is prepared, the dispersion is applied to the polyester-based synthetic fiber material by the pad-dry-steam method, the pad-steam method, the pad-dry-cure method, etc. at a heat treatment temperature of 100° C. or higher, or a package dyeing machine such as a jet dyeing machine, beam dyeing machine or cheese dyeing machine is used to apply the dispersion to the polyester-based synthetic fiber material by immersion heating at a heating temperature of 100° C. or higher. The application of the dispersion to the polyester-based synthetic fiber material by the immersion heating method in this manner may be performed before, during or after dyeing of the polyester-based synthetic fiber material, but there are fewer process steps if it is performed during the dyeing, and thus operation efficiency may be improved.

In addition, a dispersant or stabilizer may be used if necessary for the preparation of the dispersion of the phosphoryl compound in water.

Dispersants which may be used include, for example, polyoxyalkylene glycols such as polyoxyethylene glycol, polyoxyethylene polyoxypropylene block polymer, etc. and their fatty acid esters; polyhydric alcohol ethers such as polyoxyethylene pentaerythrit ether, polyoxyethylene sorbit ether, etc. and their fatty acid esters; polyoxyalkylene ether derivatives such as polyoxyethylene alkyl phenyl ether, polyoxyethylene styrylphenyl ether and polyoxyethylene alkyl styrylphenyl ether, etc. and their fatty acid esters, sulfuric acid esters or sulfuric acid ester salts; and aromatic sulfonates and their formaldehyde condensation products. The fatty acids in this case are usually unsaturated or saturated fatty acids of 12–18 carbon atoms.

Also, stabilizers which may be used include, for example, polyvinyl alcohol, methyl cellulose, carboxymethyl cellulose, starch paste, and the like.

When one of the aforementioned phosphoryl compounds is added to a polyester-based synthetic fiber material in the manner described above, if the amount of the phosphoryl compound is less than 1 wt % with respect to the polyester-based synthetic fiber material adequate flame retardancy cannot be imparted to the polyester-based synthetic fiber material, while even with amounts of 10 wt % or greater there is practically no change in the effect of flame retardancy on the polyester-based synthetic fiber material, with the only result being that the quality of its hand is impaired and it becomes hard; therefore, the phosphoryl compound is preferably applied to the polyester-based synthetic fiber material in an amount in the range of 1 to 10 wt %.

According to the present invention, since a flame retardant compound containing at least one of the types of phosphoryl compounds represented by the above general formulas (1) to (4) is added to a fiber material composed of polyester-based synthetic fibers to impart flame retardancy to the polyester-based synthetic fiber material, there is provided the same high flame-retarding effect as obtained when conventional halogen compounds are used, without the degradation and volatilization of the flame retardant compound at 345°–400° C., the inflammation point of polyester-based synthetic fibers, which occur when conventional phosphorus-containing compounds are used, while there is also no generation of poisonous gas in the case of combustion of the polyester-based synthetic fiber material, as occurs when halogen compounds are used.

In addition, the above-mentioned phosphoryl compounds added to polyester-based synthetic fiber materials impart flame retardancy which is highly durable against laundering, etc., without gradually migrating through the surface of the polyester-based synthetic fiber materials with the passing of time as occurs in the case of conventionally used phosphorus-containing compounds, and therefore disperse dyes do not migrate through the surface of the polyester-based synthetic fiber materials with the flame retardant compounds, and the color fastness is not lowered.

The present invention is explained below by way of the following examples which are not intended to be restrictive.

EXAMPLE 1

In this example, as the fiber material composed of polyester-based synthetic fibers there was used a woven fabric consisting of a polyethylene terephthalate warp of 75 denier/36 filaments and weft of 105 denier/53 filaments, and having a warp count of 8000 threads/m, a weft count of 3200 threads/m, and a weight of 103 g/m².

To obtain a flame retardant compound to impart flame retardancy to a fabric made of this polyethylene terephthalate, in this example 1.0 mole of phenylphosphoric dichloride and 2.0 moles of 4-(2-hydroxyethoxy)methylbenzoate, in an ethyl acetate solvent, were added to a glass container equipped with a condenser and a heating stirrer, and allowed to react for 3 hours while circulating the above-mentioned solvent in the presence of a triethylamine catalyst.

After the reaction, the solution was cooled, the hydrochloric acid in the triethylamine was removed, and then the ethyl acetate solvent was removed under reduced pressure to obtain a flame retardant compound comprising the phosphoryl compound represented by formula (9) below. The weight-average molecular weight of this flame retardant compound was approximately 514.

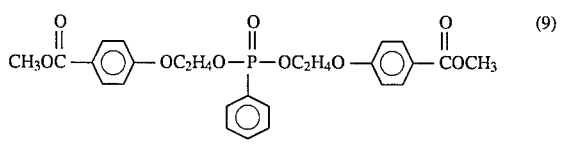

(9)

In order to obtain a flame retardant compound to impart flame retardancy to the fabric in this example, 2.0 mole of bis(2-hydroxyethyl)terephthalate was used instead of the 4-(2-hydroxyethoxy)methylbenzoate used in Example 1, and the procedure in Example 1 was otherwise followed to obtain a flame retardant compound comprising the phosphoryl compound represented by formula (10) below. The weight-average molecular weight of this flame retardant compound was approximately 1300.

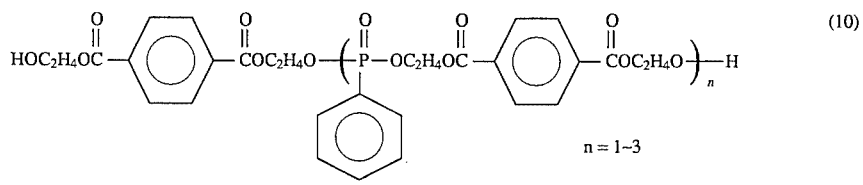

Next, in order to apply the flame retardant compound obtained in the manner described above to the polyethylene terephthalate fabric, in this example, 5 parts by weight of a 20 molar addition product of tristyrenatedphenol ethylene oxide was added as a dispersant to 45 parts by weight of the flame retardant compound, and 50 parts by weight of water was added thereto while stirring for emulsification, after which 0.2 part by weight of carboxymethyl cellulose was then added as a stabilizer to obtain a milky white emulsion.

Also, a minicolor dyeing machine, manufactured by Techsam Giken Co., was used to finish the polyethylene terephthalate fabric with the flame retardant compound-containing emulsion by immersion under the following conditions.

| | |
|---|---|
| Disperse dye (C.I. Disperse Blue 56) | 1% o.w.f. |
| Flame retardant compound-containing emulsion | 20% o.w.f. |
| 90% acetic acid | 0.3 cc/l |
| Treatment temperature | 130° C. |
| Treatment time | 30 minutes |
| Goods to liquor ratio | 1:15 |

Also, the fabric treated with the emulsion in the above manner was subjected to reduction cleaning at 80° C. for 20 minutes in a solution containing 1 g/l of a soaping agent comprising a sulfuric acid ester of polyoxyethylene nonyl phenol, 2 g/l of hydrosulfite and 1 g/l of caustic soda, and was then dried at 110° C. for 5 minutes.

EXAMPLE 2

In this example, the same type of polyethylene terephthalate fabric as in Example 1 above was used as the fiber material composed of polyester-based synthetic fibers, and only the flame retardant compound applied to the fabric was changed.

The flame retardant compound represented by formula (10) was then applied to a polyethylene terephthalate fabric in exactly the same manner as in Example 1.

EXAMPLE 3

In this example as well, the same type of polyethylene terephthalate fabric as in Example 1 above was used as the fiber material composed of polyester-based synthetic fibers, and only the flame retardant compound applied to the fabric was changed.

In order to obtain a flame retardant compound to impart flame retardancy to the fabric in this example, 2.0 moles of bis(4-hydroxyethoxyphenyl)sulfone was used instead of the 4-(2-hydroxyethoxy)methylbenzoate used in Example 1, and the procedure in Example 1 was otherwise followed to obtain a flame retardant compound comprising the phosphoryl compound represented by formula (11) below. The weight-average molecular weight of this flame retardant compound was approximately 2100.

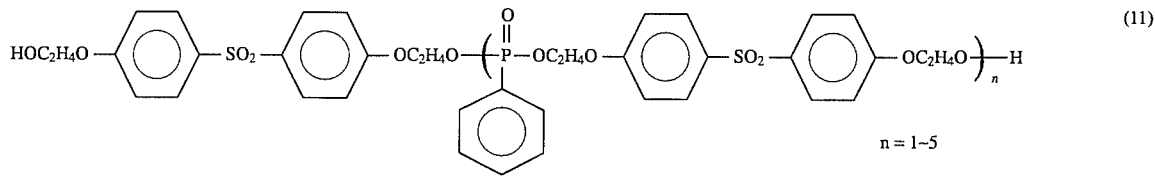

The flame retardant compound represented by formula (11) was then applied to the polyethylene terephthalate fabric in exactly the same manner as in Example 1.

EXAMPLE 4

In this example as well, the same type of polyethylene terephthalate fabric as in Example 1 above was used as the fiber material composed of polyester-based synthetic fibers, and only the flame retardant compound applied to the fabric was changed.

In order to obtain a flame retardant compound to impart flame retardancy to the fabric in this example, 2.0 moles of bis(4-hydroxyethoxyphenyl)propane was used instead of the 4-(2-hydroxyethoxy)methylbenzoate used in Example 1, and the procedure in Example 1 was otherwise followed to obtain a flame retardant compound comprising the phosphoryl compound represented by formula (12) below. The weight-average molecular weight of this flame retardant compound was approximately 2000.

terephthalate, 2.0 moles of p-cresol and 0.01 mole of aluminum chloride were simultaneously added to a glass container equipped with a condenser and a heating stirrer, and heated to 150° C. in a nitrogen air flow and allowed to react for 6 hours.

After the reaction, the product was washed with water according to a usual method to obtain a flame retardant compound consisting of a mixture of the phosphoryl compounds represented by the following general formulas (13) to (16).

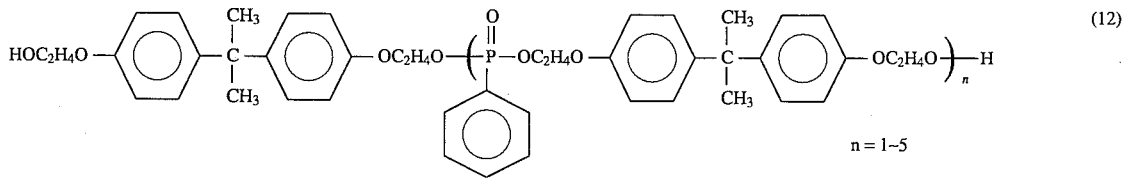

The flame retardant compound represented by formula (12) was then applied to the polyethylene terephthalate fabric in exactly the same manner as in Example 1.

EXAMPLE 5

In this example as well, the same type of polyethylene terephthalate fabric as in Example 1 above was used as the fiber material composed of polyester-based synthetic fibers, and only the flame retardant compound applied to the fabric was changed.

In order to obtain a flame retardant compound to impart flame retardancy to the fabric in this example, 1.0 mole of phosphorus oxychloride, 1.0 mole of bis(2-hydroxyethyl)

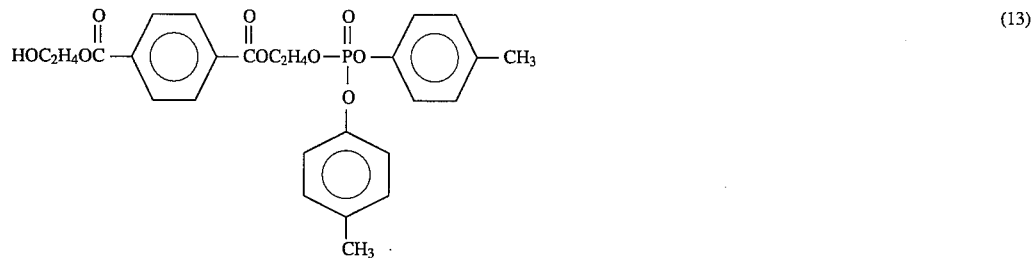

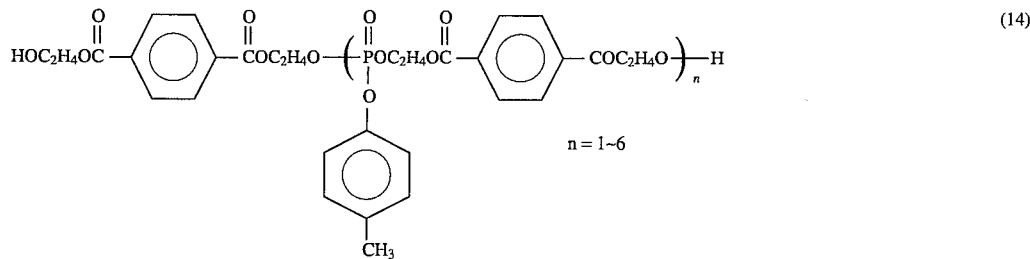

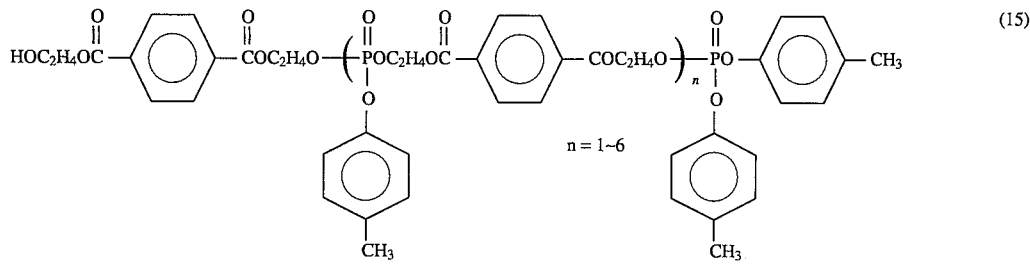

Next, in order to apply the flame retardant compound obtained in the manner described above to the polyethylene terephthalate fabric, in this example, 5 parts by weight of a 20 molar addition product of nonylphenol ethylene oxide was added as a dispersant to 45 parts by weight of the flame retardant compound, and 50 parts by weight of water was added thereto while stirring for emulsification, after which 0.2 part by weight of carboxymethyl cellulose was then added as a stabilizer to obtain a milky white emulsion.

The flame retardant compound consisting of a mixture of the phosphoryl compounds represented by the above general formulas (13) to (16) was then applied to the polyethylene terephthalate fabric in exactly the same manner as in Example 1.

EXAMPLE 6

In this example as well, the same type of polyethylene terephthalate fabric as in Example 1 above was used as the fiber material composed of polyester-based synthetic fibers, and only the flame retardant compound applied to the fabric was changed.

In order to obtain a flame retardant compound to impart flame retardancy to the fabric in this example, 1.0 mole of phenylphosphonic dichloride, 1.0 mole of bis(2-hydroxyethyl)terephthalate, 1.0 mole of phenol and 0.01 mole of calcium chloride were simultaneously added to a glass container equipped with a condenser and a heating stirrer, and heated to 150° C. in a nitrogen air flow and allowed to react for 3 hours, after which they were further heated to 180° C. and allowed to react for 7 hours. After the reaction, the product was washed with water according to a usual method to obtain a flame retardant compound consisting of a mixture of the phosphoryl compounds represented by the following general formulas (17) to (21).

The flame retardant compound consisting of a mixture of the phosphoryl compounds represented by the above general formulas (17) to (21) was then applied to the polyethylene terephthalate fabric in exactly the same manner as in Example 1.

EXAMPLE 7

In this example as well, the same type of polyethylene terephthalate fabric as in Example 1 above was used as the fiber material composed of polyester-based synthetic fibers, and only the flame retardant compound applied to the fabric was changed.

In order to obtain a flame retardant compound to impart flame retardancy to the fabric in this example, 1.0 mole of phenylphosphonic dichloride, 1.0 mole of bis(2-hydroxyethyl)terephthalate, 1.0 mole of p-cumylphenol and 0.01 mole of calcium chloride were simultaneously added to a glass container equipped with a condenser and a heating stirrer, and heated to 150° C. in a nitrogen air flow and allowed to react for 3 hours, after which they were further heated to 180° C. and allowed to react for 7 hours. After the reaction, the product was washed with water according to a usual method to obtain a flame retardant compound consisting of a mixture of the phosphoryl compounds represented by the following general formulas (22) to (26).

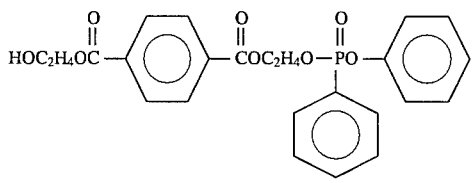

(17)

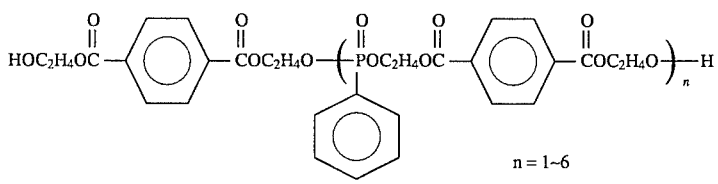

(18)

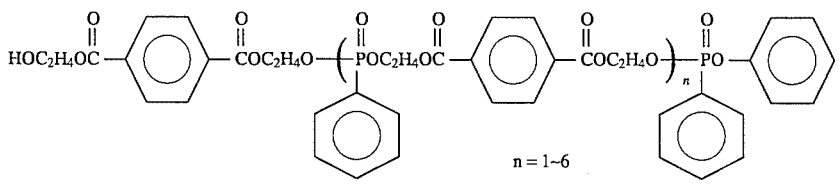

(19)

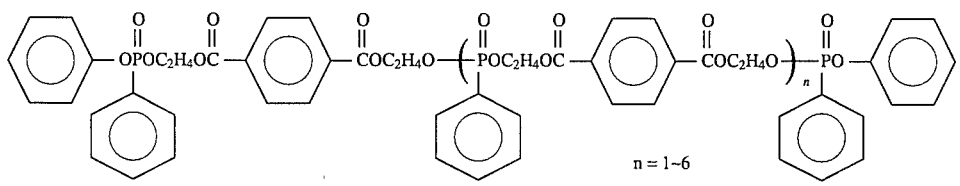

(20)

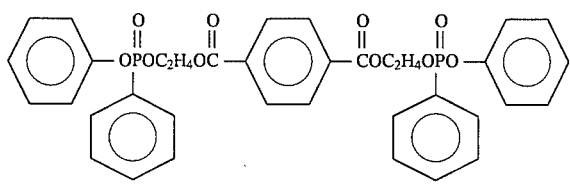

(21)

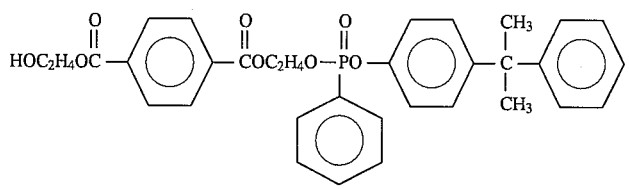 (22)

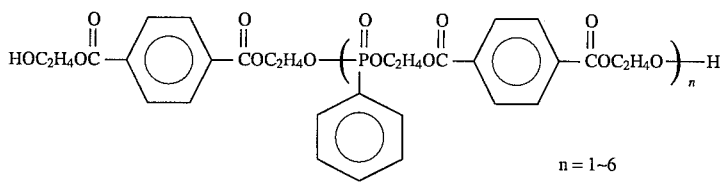 (23)

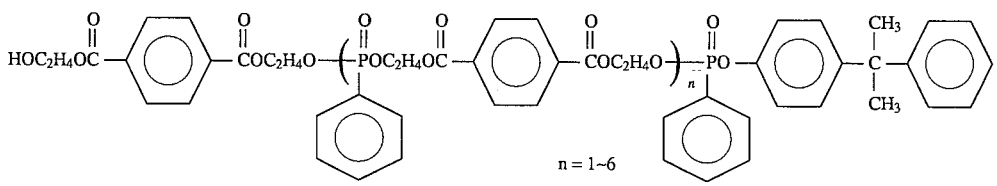 (24)

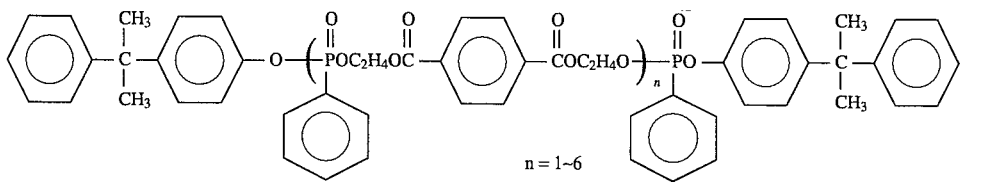 (25)

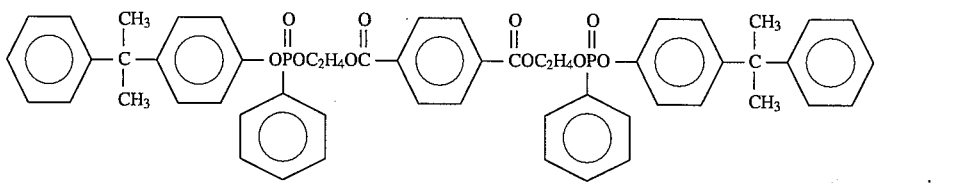 (26)

The flame retardant compound consisting of a mixture of the phosphoryl compounds represented by the above general formulas (22) to (26) was then applied to the polyethylene terephthalate fabric of the type described above, in exactly the same manner as in Example 1.

EXAMPLE 8

In this example as well, the same type of polyethylene terephthalate fabric as in Example 1 above was used as the fiber material composed of polyester-based synthetic fibers, and only the flame retardant compound applied to the fabric was changed.

In order to obtain a flame retardant compound to impart flame retardancy to the fabric in this example, 1.0 mole of phosphorus oxychloride, 2.0 moles of bis(2-hydroxyethyl-)isophthalate, 1.0 mole of p-isopropylphenol and 0.01 mole of aluminum chloride were simultaneously added to a glass container equipped with a condenser and a heating stirrer, and heated to 150° C. in a nitrogen air flow and allowed to react for 6 hours, after which the product was washed with water according to a usual method to obtain a flame retardant compound consisting of a mixture of the phosphoryl compounds represented by the following general formulas (27) to (31).

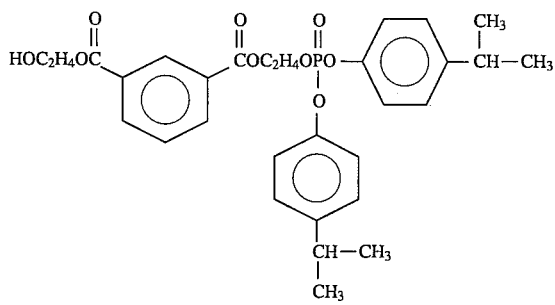 (27)

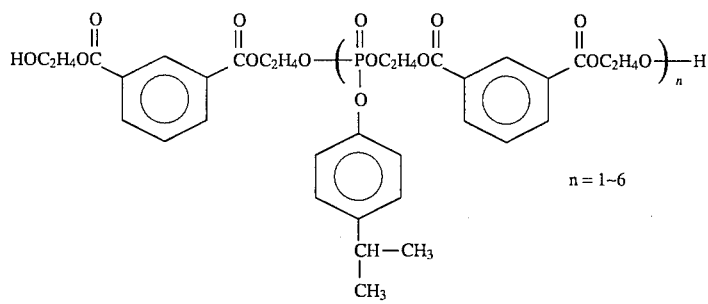

(28)

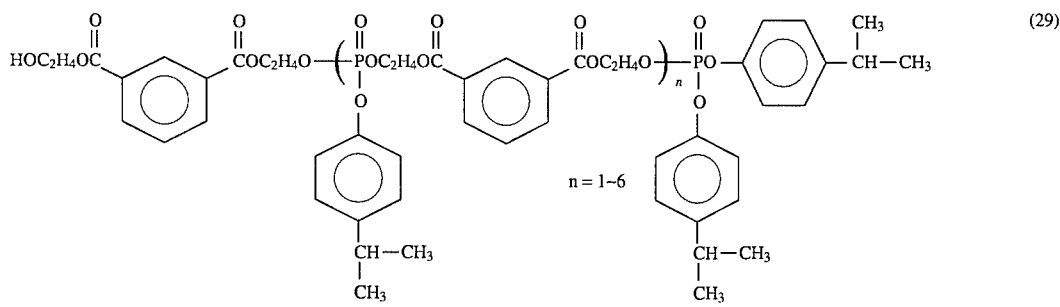

(29)

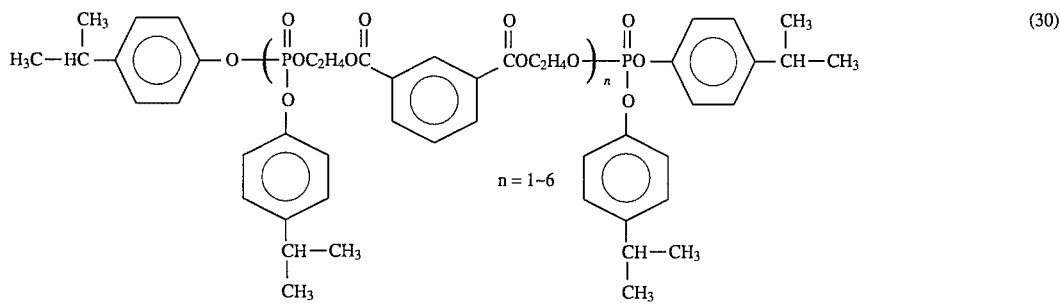

(30)

(31)

The flame retardant compound consisting of a mixture of the phosphoryl compounds represented by the above general formulas (27) to (31) was then applied to the polyethylene terephthalate fabric of the type described above, in exactly the same manner as in Example 1.

Comparative Example 1

In this comparative example as well, the same type of polyethylene terephthalate fabric as in Example 1 above was used as the fiber material composed of polyester-based synthetic fibers, but the flame retardant compound applied to the fabric was changed to the conventionally used phosphoric compound tris(β-chloroethyl)phosphate.

This flame retardant compound was then applied to the polyethylene terephthalate fabric in exactly the same manner as in Example 1 above.

Comparative Example 2

In this comparative example as well, the same type of polyethylene terephthalate fabric as in Example 1 above was used as the fiber material composed of polyester-based synthetic fibers, but the flame retardant compound applied to the fabric was changed to the conventionally used phosphoric compound tricresyl phosphate.

This flame retardant compound was then applied to the polyethylene terephthalate fabric in exactly the same manner as in Example 1 above.

Comparative Example 3

In this comparative example as well, the same type of polyethylene terephthalate fabric as in Example 1 above was used as the fiber material composed of polyester-based synthetic fibers, but the flame retardant compound applied to the fabric was changed to the conventionally used halogen compound hexabromocyclododecane.

Also, to 45 parts by weight of this hexabromocyclododecane there were added 5 parts by weight of a 20 molar addition product of tristyrenated phenol ethylene oxide as a dispersant and 50 parts by weight of water, and a sand mill was used to produce finely divided particles for dispersion, after which 0.2 part by weight of carboxymethyl cellulose was further added as a stabilizer to obtain the dispersion.

This dispersion was then applied to the polyethylene terephthalate fabric in exactly the same manner as in Example 1 above.

Next, the fabrics treated with flame retardant compounds as described in Examples 1 to 8 and Comparative Examples 1 to 3, and an unfinished fabric which had not been treated with a flame retardant compound, were examined to determine their flame retardancy and dye bleeding.

To determine the flame retardancy of each of the above-mentioned fabrics, each fabric was examined in its initially obtained state, in the state after laundering by the laundering method specified by JIS L-1042, and in the state after dry cleaning by the dry cleaning method specified by JIS L-1018, selecting 3 different locations for the tests, and the flame retardancy of each fabric was determined by the treating methods for flammability of clothes specified by JIS L-1091 Method D, the results of which are listed in Table 1.

Also, in order to determine the dye bleeding of each of the above-mentioned fabrics, each initially obtained fabric and each fabric allowed to stand for 7 days at a temperature of 70° C. and a humidity of 95% as treatment for acceleration of the daily change using a jungle tester, was measured for dye bleeding feature according to the treating method for color fastness to water specified by JIS L-0846, the results of which are listed in Table 2.

TABLE 1

| | Flame retardancy (Flame contact times) | | |
|---|---|---|---|
| | Initial | After laundering | After dry cleaning |
| Example 1 | 4, 4, 4 | 5, 4, 4 | 4, 4, 4 |
| Example 2 | 5, 5, 4 | 5, 5, 5 | 5, 4, 4 |
| Example 3 | 5, 4, 4 | 4, 5, 4 | 5, 4, 4 |
| Example 4 | 4, 5, 4 | 4, 4, 5 | 4, 5, 4 |
| Example 5 | 5, 4, 4 | 5, 4, 4 | 4, 5, 4 |
| Example 6 | 5, 5, 4 | 5, 5, 5 | 5, 4, 4 |
| Example 7 | 5, 4, 4 | 4, 5, 4 | 5, 4, 4 |
| Example 8 | 5, 4, 4 | 4, 4, 5 | 5, 5, 4 |
| Comp. Ex. 1 | 3, 3, 2 | 2, 3, 3 | 2, 3, 2 |
| Comp. Ex. 2 | 2, 1, 2 | 1, 2, 1 | 2, 2, 1 |
| Comp. Ex. 3 | 4, 4, 4 | 5, 4, 4 | 5, 4, 4 |
| Unfinished | 1, 1, 1 | 1, 1, 1 | 1, 1, 1 |

TABLE 2

| | Dye-bleeding feature | |
|---|---|---|
| | Initial | After standing |
| Example 1 | 4 | 4 |
| Example 2 | 4 | 4 |
| Example 3 | 4 | 4 |
| Example 4 | 4 | 4 |
| Example 5 | 4 | 4 |
| Example 6 | 4 | 4 |
| Example 7 | 4 | 4 |
| Example 8 | 4 | 4 |
| Comp. Ex. 1 | 3 | 2 |
| Comp. Ex. 2 | 4 | 2 |
| Comp. Ex. 3 | 4 | 4 |
| Unfinished | 4–5 | 4–5 |

As is clear from the results shown in Table 1, the fabrics in Examples 1 to 8 to which had been applied the aforementioned phosphoryl compounds as flame retardant compounds, though being non-halogen compounds, exhibited very excellent flame retardancy either equal to or exceeding that of the fabric of Comparison Example 3 to which had been applied the halogen compound hexabromocyclododecane as the flame retardant compound, in all three initial, laundered and dry cleaned states, and there was no loss in the quality of hand of the fabrics by application of these flame retardant compounds.

In contrast, the fabrics of Comparative Examples 1 and 2, which had been treated with conventionally used phosphorous-based compounds as flame retardant compounds, had poorer flame retardancy than the fabrics of Examples 1 to 8 in all three initial, laundered and dry cleaned states.

In addition, as is clear from the results shown in Table 2, the fabrics of Comparative Examples 1 and 2 had stronger dye bleed and poorer fastness, while the fabrics of Examples 1 to 8, which had been treated with the flame retardant compounds composed of the aforementioned phosphoryl compounds, had low dye bleeding and satisfactory fastness, similar to the fabric of Comparison Example 3 which had been treated with the halogen-containing flame retardant compound.

Furthermore, since the fabrics obtained in Examples 1 to 8 did not employ halogen compounds as the flame retardant compounds, there was no generation of harmful halogen gas during combustion as occurred in the case of the fabric of Comparative Example 3 which had been treated with the halogen-containing flame retardant compound.

As mentioned above, in the method of flame retardant finishing of polyester-based synthetic fiber materials according to the present invention, since a flame retardant containing at least one type of the phosphoryl compounds with an aryl group in the molecule, represented by general formulas (1) to (4), is used to impart flame retardancy to a fiber material composed of polyester-based synthetic fibers, there is provided the same high flame retarding effect on polyester-based synthetic fiber materials as is obtained when conventional halogen compounds are used as flame retardant compounds, without the degradation and volatilization of the flame retardant compound below the inflammation point of the polyester-based synthetic fibers, which occur when conventional phosphorus-containing compounds are used as flame retardants, making it possible to obtain highly flame-retardant polyester-based synthetic fiber materials.

Furthermore, the above-mentioned phosphoryl compounds applied to polyester-based synthetic fiber materials impart flame retardancy thereto which is highly durable against laundering, etc., without progressively migrating through the surface of the polyester-based synthetic fiber materials with the passing of time as occurs in the case of conventionally used phosphorus-containing compounds, and therefore disperse dyes do not migrate through the surface of the polyester-based synthetic fiber materials together with the flame retardant compound, and the dye fastness is not lowered.

Moreover, since according to the present invention halogen compounds are not used as the flame retardants, there is no generation of poisonous halogen gas in the event of combustion of the flame retardant-applied polyester-based synthetic fiber materials, and thus there is no adverse effect on the environment.

We claim:

1. A method for flame retardant finishing of polyester-based synthetic fiber materials which comprises applying by post-treatment at least one flame retardant compound selected from the group consisting of the phosphoryl compounds represented by the following general formulas (1) to (4) to a fiber material composed of polyester-based synthetic fibers:

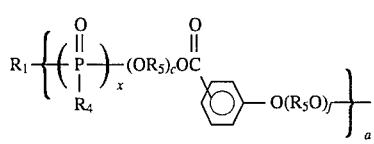  (1)

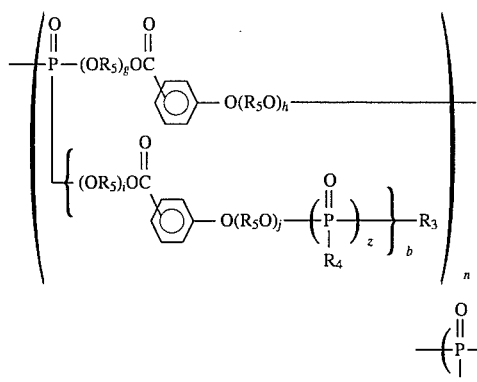

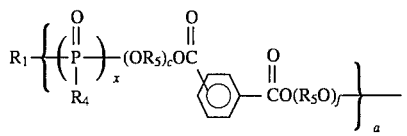  (2)

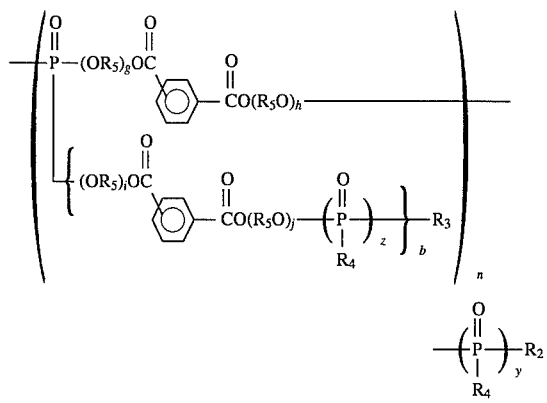

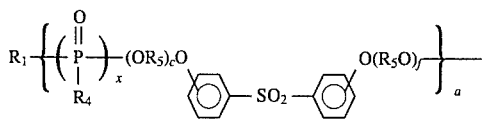  (3)

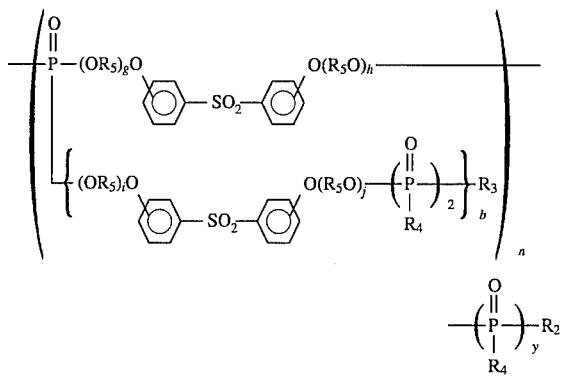

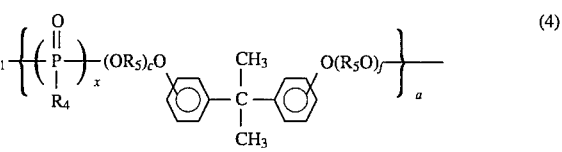

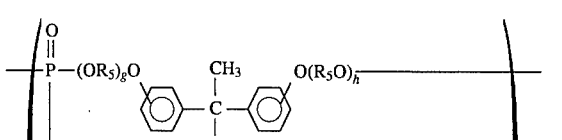  (4)

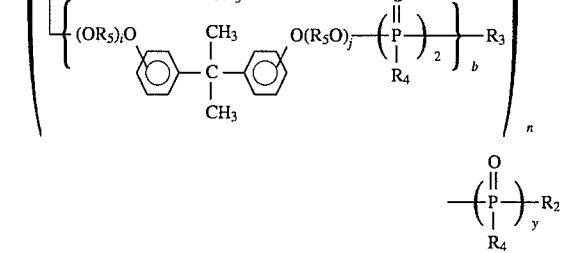

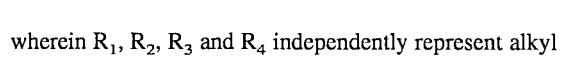

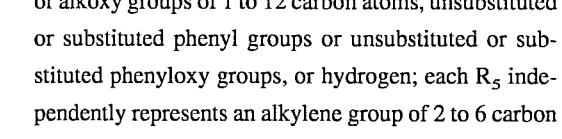

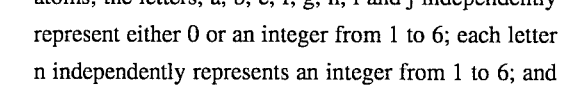

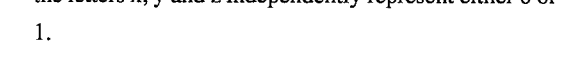

wherein $R_1$, $R_2$, $R_3$ and $R_4$ independently represent alkyl or alkoxy groups of 1 to 12 carbon atoms, unsubstituted or substituted phenyl groups or unsubstituted or substituted phenyloxy groups, or hydrogen; each $R_5$ independently represents an alkylene group of 2 to 6 carbon atoms; the letters, a, b, e, f, g, h, i and j independently represent either 0 or an integer from 1 to 6; each letter n independently represents an integer from 1 to 6; and the letters x, y and z independently represent either 0 or 1.

* * * * *